United States Patent [19]

Rementería

[11] Patent Number: 4,616,507
[45] Date of Patent: Oct. 14, 1986

[54] DEVICE FOR ASSEMBLING/DISASSEMBLING A READER HEAD ON OR FROM ITS GUIDED SCALE WHILE THIS REMAINS SECURED TO A MACHINE TOOL BED PLATE

[75] Inventor: Manuel B. Rementería, Guipûzcoa, Spain

[73] Assignee: Aurki, S. Coop. Ltda., Spain

[21] Appl. No.: 684,692

[22] Filed: Dec. 21, 1984

[30] Foreign Application Priority Data

May 31, 1984 [ES] Spain ................................ 279621

[51] Int. Cl.$^4$ .............................................. G01D 11/24
[52] U.S. Cl. ........................................................ 73/431
[58] Field of Search ......... 73/431; 250/231 R, 237 G, 250/239; 356/374, 375; 33/125 C

[56] References Cited

U.S. PATENT DOCUMENTS 3,833,303  9/1974  Burns et al. ................. 250/237 G
4,063,086  12/1977  Hirose ......................... 250/231 R Primary Examiner—Jerry W. Myracle
Attorney, Agent, or Firm—Lucas & Just

[57] ABSTRACT

An improved device for assembling/disassembling a reader head on or from its guided scale while this remains secured to a machine tool bed plate which, being comprised of a guided scale and a reader head, where the guided scale is made up from a main body and two side blocks with elements both for fastening the side blocks to the main body as well as for fastening the assembly to the machine tool bed plate, is characterized by the fact that each of the side blocks is provided with a generously sized hollow open at its sides and at the front towards which the reader head faces, and with a guide around the perimeter of the hollow, and also by the fact that a side cover with means for attachment to the corresponding block is inserted into said guide around the perimeter, all in such a way that in order to assemble/disassemble the reader head it is but necessary to remove one of the side covers without disturbing the alignment of the scale.

3 Claims, 2 Drawing Figures

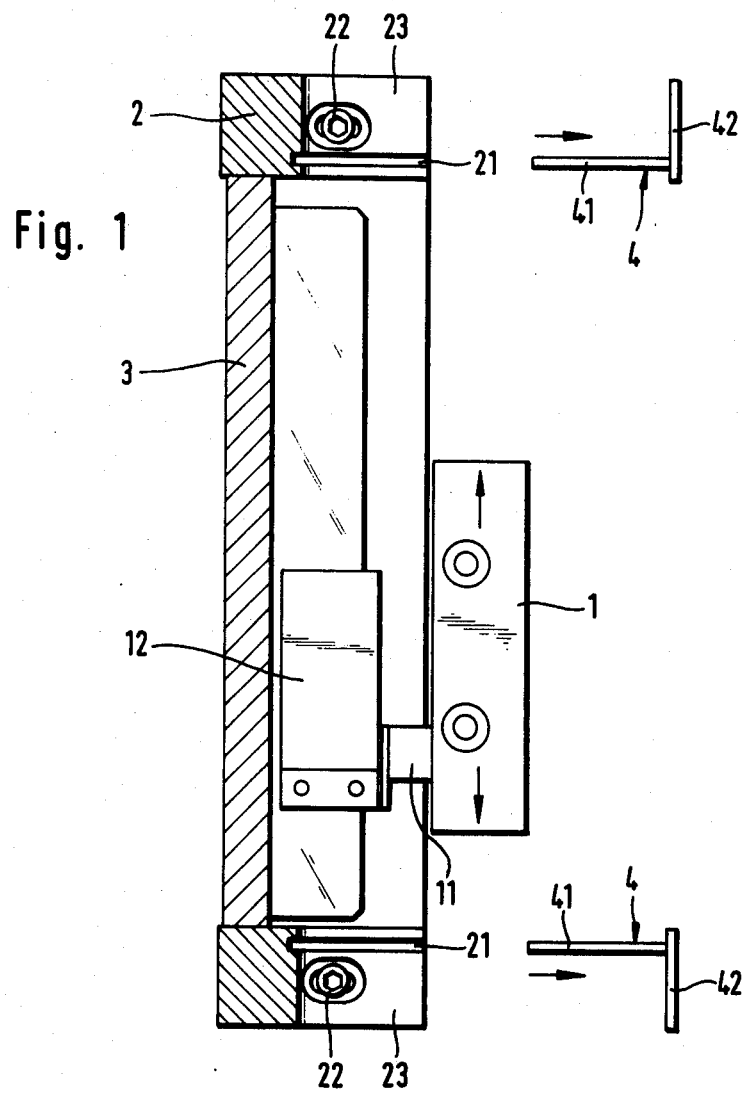
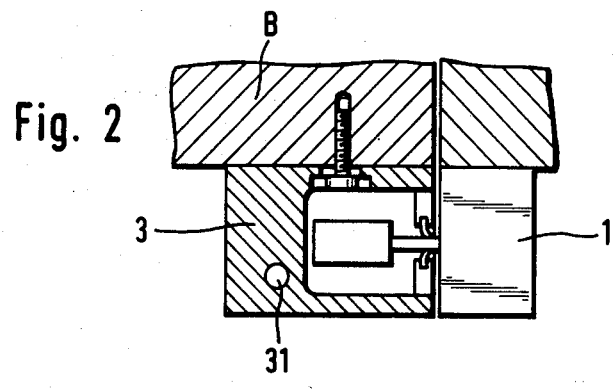

DEVICE FOR ASSEMBLING/DISASSEMBLING A READER HEAD ON OR FROM ITS GUIDED SCALE WHILE THIS REMAINS SECURED TO A MACHINE TOOL BED PLATE

Technological advances in the machine tool field have led to the use of reader heads arranged upon machine guided scales where these in turn are attached to the machine tool bed plate. Such reader heads may be of the optical, electronic or similar kinds, and their use allows a very high degree of accuracy to be attained when machining.

The guided scale is comprised of a main body and two side blocks with means both for fastening said side blocks to the main body as well as for fastening the assembly to the machine tool bed plate. Said main body is provided with guide ways in which the reader head can travel.

A significant problem with these assemblies (guided scale and reader head) arises when it is required to change the reader head (due to failure or other reasons), because to do so it is necessary to remove the side block at the side from which it is wished to withdraw the reader head (which involves a loss of the alignment of the guided scale with respect to the machine tool bed plate), with said side block being removed from the main body to which it is sealed to ensure internal tightness, and to withdraw the reader head and then repeat the whole procedure in reverse order.

The purpose then is to attain a device which will overcome all these limitations and allow the reader head to be replaced quickly and easily, with no need to remove the guided scale assembly from the machine bed plate.

To this end, the improved device for assembling/disassembling a reader head on or from its guided scale while this remains secured to a machine tool bed plate as covered by this invention which is comprised of a guided scale and a reader head, where the guided scale is made up from a main body and two side blocks with means both for fastening said side blocks to the main body as well as for fastening the assembly to the machine tool bed plate, is peculiar inasmuch that each of said side blocks is provided with a generously sized hollow open at the sides and at the front towards which the reader head faces, and with a guide around the perimeter of said hollow.

It is moreover characterized by the fact that a side cover with means of attachment to the corresponding block is inserted into said guide around the perimeter in such a way that in order to assemble/disassemble the reader head, it is simply necessary to remove one of said side covers without disturbing the alignment of the scale.

It is characterized furthermore by the fact that said side cover is an "L" shaped body, one of whose flanges is accommodated in said guide, while the other covers the front of said hollow when in the working position.

The device is also characterized by the fact that said perimeter guide is located in the area which is close to the side that lies against the main body.

FIG. 1 depicts a plan view of the aforesaid improved device for assembling/disassembling a reader head on or from its guided scale while this remains secured to a machine tool bed plate as covered by this invention.

FIG. 2 is a diagramatic elevational sectional view of FIG. 1.

In FIG. 1, the side covers (4) are shown in the assembled position, while the main body (3) and side blocks (2) are shown in sectional view to illustrate their design and that of the reader head (1).

This invention covers an improved device for assembling/disassembling a reader head on or from its guided scale while this remains secured to a machine tool bed plate.

The machine tool bed plate (B) embodies a guided scale along which a reader head is able to travel.

The guided scale is made up from a main body (3) and two side blocks (2) possessing means of attachment (31) between them (preferably in the form of screws housed in threaded holes) and means of attachment (22) located upon said side blocks (2) to secure the whole assembly to the machine tool bed plate (B).

A reader head (1) travels along said guided scale and does so specifically on its body (3) for which purpose this latter is provided with at least one longitudinal guide.

Reader head (1) is fitted with its reader device (12) which is attached thereto by means of a bracket (11).

In accordance with the invention, each side block (2) possesses a generously sized hollow (23) which is open at the sides and at the front towards which the reader head faces (1).

Said hollow (23) forms a guide (21) about the perimeter in the shape of a "U" with vertical flange, which is located close to the side of block (2) and against the main body (1).

The invention is completed with two side covers (4) each fitted with means of attachment to the respective side block (2).

Each one of said side covers (4) is an "L" shaped body, one of whose arms (41) is inserted into the relevant guide (21), while the other arm (42), at right angles to the former, covers the front of said hollow in the working position.

Accordingly, whenever it is required to replace or repair the reader head (1), all that is necessary is:

(a) To remove one of the covers (4), and
(b) To disassemble the reader head (1), with the above procedure being repeated in reverse order when reassembling, in such a way that at no time is the guided scale alignment or any other parts of the device disturbed.

I claim:

1. An improved device for assembling/disassembling a reader head on or from its guided scale while said guided scale remains secured to a machine tool bed plate, said guided scale having a main body and two side blocks, each of said side blocks having a means to attach to said main body and a means to attach to said machine tool bed plate wherein the improvement comprises each of said side blocks having a generously sized hollow opening, said hollow located at the sides of said side blocks and at the side facing the reader head, each said hollow having a guide around the perimeter of said hollow, and a side cover for each of said side blocks, said side cover having means for engaging said guide around the perimeter such that in order to assemble/disassemble the reader head without disturbing the alignment of the scale one of the side covers is removed.

2. The device of claim 1 wherein said side cover is an "L" shaped body, said "L" shaped side cover having one arm for inserting into said guide around the perimeter of said hollow while the other arm of said "L" shaped side cover covers the side of said hollow facing the reader head.

3. The device according to claim 2 wherein said guide around the perimeter of said hollow is located in the area close to the side of said side block which abuts the main body.

* * * * *